US012386685B2

(12) United States Patent
Marquie et al.

(10) Patent No.: US 12,386,685 B2
(45) Date of Patent: Aug. 12, 2025

(54) FACILITATING ACCESS TO API INTEGRATIONS

(71) Applicant: Citrix Systems, Inc., Fort Lauderdale, FL (US)

(72) Inventors: Bruno Marquie, Fort Collins, CO (US); Harshavardhan Gupta, Kishanganj (IN); Madhumitha Raveendar, Cary, NC (US); Gaurav Saraf, Apex, NC (US); Venkatesh Bonageri, Raleigh, NC (US); Sangamesh Vishweshwar Kalagond, Vijayapura (IN); Rakesh Kumar, Cary, NC (US)

(*) Notice: Subject to any disclaimer, the term of this patent is extended or adjusted under 35 U.S.C. 154(b) by 785 days.

(21) Appl. No.: 17/505,065

(22) Filed: Oct. 19, 2021

(65) Prior Publication Data

US 2023/0123860 A1    Apr. 20, 2023

(51) Int. Cl.
*G06F 9/54*       (2006.01)
*G06F 16/2457*    (2019.01)

(52) U.S. Cl.
CPC ........ *G06F 9/543* (2013.01); *G06F 16/24575* (2019.01)

(58) Field of Classification Search
None
See application file for complete search history.

(56) References Cited

U.S. PATENT DOCUMENTS

| | | | |
|---|---|---|---|
| 2018/0278471 A1* | 9/2018 | Burli | G06F 9/451 |
| 2019/0042323 A1* | 2/2019 | Shotton | G06F 9/465 |
| 2020/0192727 A1* | 6/2020 | Savenkov | G06F 9/547 |
| 2021/0117946 A1* | 4/2021 | Poole | G06Q 20/202 |
| 2021/0294671 A1* | 9/2021 | Hirsekorn | G06F 9/541 |

\* cited by examiner

*Primary Examiner* — Umut Onat

(57) ABSTRACT

One disclosed method involves receiving, at a first application programming interface (API) endpoint of a computing system, a first API call requesting performance of a first type of operation; invoking, by the computing system and based on the first API call, a first process to send at least a second API call to a second API endpoint of a first system of record; receiving, by the computing system and from the first system of record, a first response to the second API call; and sending, from the computing system to a source of the first API call, a second response that is based at least in part on the first response.

9 Claims, 11 Drawing Sheets

FACILITATING ACCESS TO API INTEGRATIONS

BACKGROUND

Various systems have been developed that allow client devices to access applications and/or data files over a network. Certain products offered by CITRIX Systems, Inc., of Fort Lauderdale, FL, including the CITRIX WORKSPACE™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method comprises receiving, by a computing system from a first device, a request to identify application programming interface (API) endpoints that are configured to perform a search operation; determining, by the computing system, that first and second API endpoints of the computing system are both configured to perform search operation operations; sending, from the computing system to the first device and based at least in part on the first and second API endpoints both being configured to perform search operations, indications of the first API endpoint and the second API endpoint; receiving, at the first API endpoint and from the first device, a first API call requesting performance of a first search operation; executing, by the computing system and based on the first API call, a first script to send at least a second API call to a third API endpoint of a first system of record, the second API call representing a request to perform the first search operation; receiving, by the computing system and from the first system of record, first search results in response to the second API call; generating, by the computing system and based at least in part on the first search results, a first response to the first API call, the first response representing the first search results; sending, from the computing system to the first device, the first response; receiving, at the second API endpoint and from the first device, a third API call requesting performance of a second search operation; executing, by the computing system and based on the third API call, a second script to generate at least a fourth API call to a fourth API endpoint of a second system of record, the fourth API call representing a request to perform the second search operation; receiving, by the computing system and from the second system of record, second search results in response to the fourth API call; generating, by the computing system and based at least in part on the second search results, a second response to the third API call, the second response representing the second search results; and sending, from the computing system to the first device, the second response.

In some of the disclosed embodiments, a method comprises receiving, at a first application programming interface (API) endpoint of a computing system, a first API call requesting performance of a first type of operation; invoking, by the computing system and based on the first API call, a first process to send at least a second API call to a second API endpoint of a first system of record; receiving, by the computing system and from the first system of record, a first response to the second API call; and sending, from the computing system to a source of the first API call, a second response that is based at least in part on the first response.

In some embodiments, a system comprises at least one processor, and at least one computer-readable medium encoded with instructions which, when executed by the at least one processor, cause the system to receive, at a first application programming interface (API) endpoint of the system, a first API call requesting performance of a first type of operation; invoke, based on the first API call, a first process to send at least a second API call to a second API endpoint of a first system of record; receive, from the first system of record, a first response to the second API call; and send, to a source of the first API call, a second response that is based at least in part on the first response.

In some embodiments, at least one non-transitory computer-readable medium is encoded with instructions which, when executed by at least one processor of a computing system, cause the computing system to receive, at a first application programming interface (API) endpoint of the system, a first API call requesting performance of a first type of operation; invoke, based on the first API call, a first process to send at least a second API call to a second API endpoint of a first system of record; receive, from the first system of record, a first response to the second API call; and send, to a source of the first API call, a second response that is based at least in part on the first response.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1A:
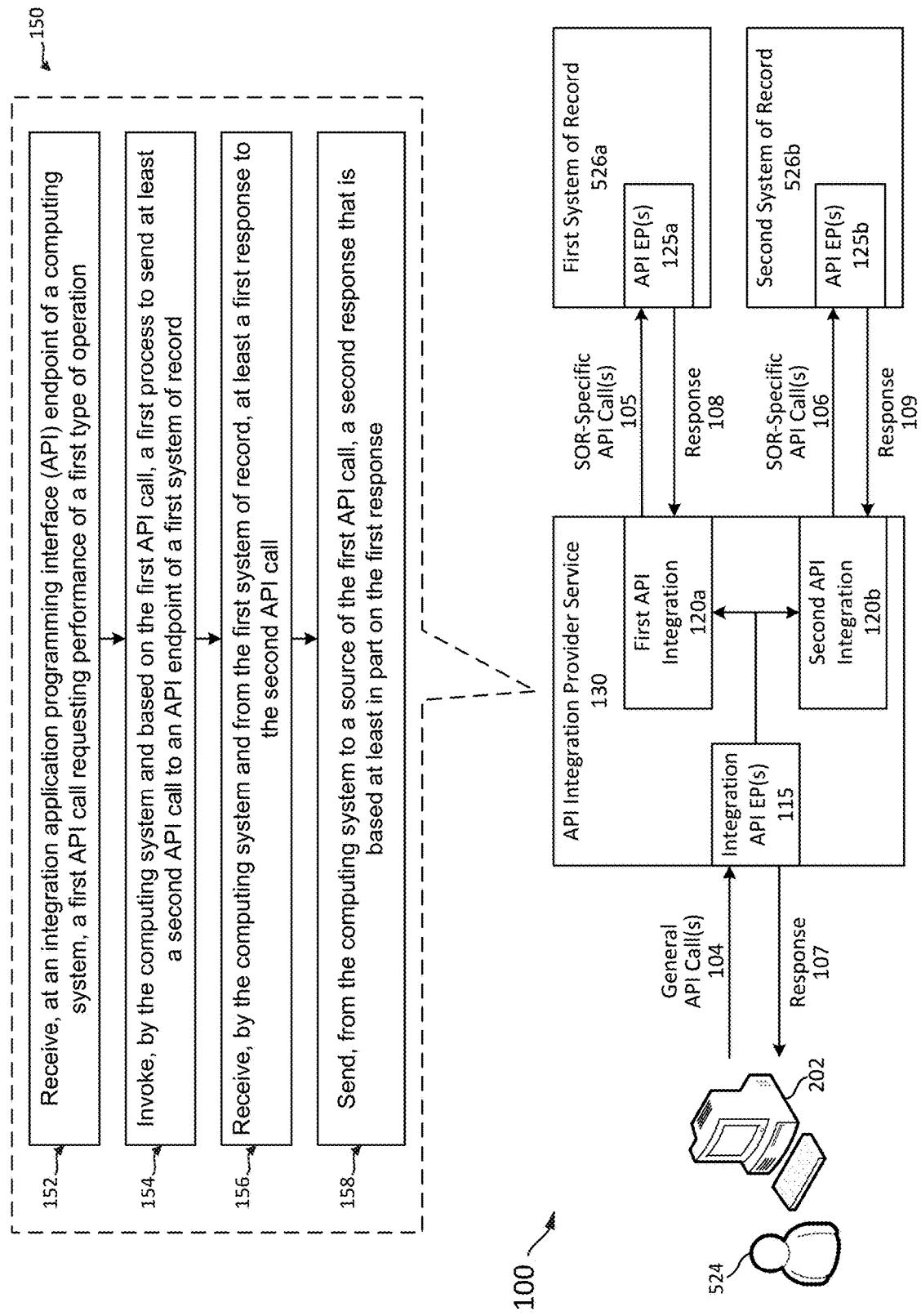
FIG. 1A is a diagram illustrating example operations of a system for facilitating access to application programming interface (API) integrations in accordance with the present disclosure.

For purposes of reading the description of the various embodiments below, the following descriptions of the sections of the specification and their respective contents may be helpful:

Section A provides an introduction to example embodiments of a system for facilitating access to API integrations in accordance with some aspects of the present disclosure;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the system for facilitating access to API integrations introduced in Section A; and Section G describes example implementations of methods, systems/devices, and computer-readable media in accordance with the present disclosure. A. Introduction to Illustrative Embodiments of a System for Facilitating Access to API Integrations Service providers may develop integrations to interact with systems of record for various purposes. For example, as described below in Section E, a multi-resource access system 500 may include a microapp service 528 (shown in FIG. 5C) that allows microapps to take actions or access resources of systems of record 526 on behalf of clients 202. In such a system, interaction between clients 202 and systems of record 526 is indirect, with clients 202 interacting with microapps of the microapp service 528, and the microapps of the microapp service 528 interacting with the systems of record 526 via the data integration provider service 530. The microapps and corresponding integrations (e.g., included in the data integration provider service 530) are typically developed in tandem, with respective integrations being specially configured and dedicated to servicing the unique needs of corresponding microapps. Moreover, such integrations may operate on behalf of a company or other entity for which the multi-resource access system 500 is deployed (e.g., using an administrator account) rather than using credentials corresponding to a particular user 524. Without receiving user-specific credentials, a system of record may be limited from providing functionality that is personalized, for example, based on a user profile.

The inventors have recognized and appreciated that improvements can be made in the manner in which the functionality of systems of record is made accessible to clients. In particular, in some implementations, an API integration provider service may be configured to not only host API integrations for various systems of record, but also make those API integrations directly accessible to clients via integration API endpoints (EPs) (which may be independent of microapps). For example, a client may send an API call to one of the integration API EPs and, in response to that API call, the API integration provider service may invoke one or more API integrations to interact with one or more systems of record 526 in a manner defined by such integration(s). Such API integration(s) may, for example, include respective scripts or other executable files that may execute processes to generate and send one or more API calls to one or more system of record (SOR) API EPs based on the API call received from the client. Such API integration(s) may also receive one or more responses from the SOR API EP(s). In some cases, an API integration may translate data in the API call received from the client to match an input schema of a particular SOR API EP, and may translate data in system of record response(s) to conform to a standard output schema. The API integration provider service may thus provide one or more integration API EP(s) that the client may use to access functionality of various systems of record using API calls having a consistent format. In some cases, the API integration provider service may send the API call(s) to the SOR API EP(s) via an HTTP proxy service, which may retrieve client credentials to authenticate the API call(s) on behalf of the client before forwarding the API call(s) to the SOR API EP(s), thus allowing a system of record to provide a response based on information associated with a client profile or account.

FIG. 1A is a diagram illustrating example operations of a system 100 for facilitating access to application programming interface (API) integrations in accordance with some aspects of the present disclosure. As shown, the system 100 may include an API integration provider service 130 that hosts at least a first API integration 120a and a second API integration 120b (collectively, API integrations 120), and that exposes those API integrations 120 to a client 202 via one or more integration API EPs 115. The API integration provider service 130 may be provided by a server or other computer system providing access to one or more client devices and/or client applications; for example, and without limitation, a server 204, a cloud computing environment 400, and/or a cloud computing environment 512, etc. Although illustrated as a computer operated by a user 524, it should be appreciated that the client 202 may take on any of numerous other forms and need not be user-operated. Several example of clients 202 that may interact with the API integration provider service 130 via the integration API EP(s) 115 are described further below. The client 202 may interact with the respective integration API EPs 115 directly; for example, by sending an API call to an integration API EP 115 and receiving a response. The respective API integrations 120a, 120b may include scripts or other executable code that may be invoked when an API call is received from the client 202. An invoked script may initiate a process to send one or more API calls to one or more SOR API EPs 125 on behalf of the client 202, and to return a response to the client 202 that is based on one or more responses received from such SOR API EP(s) 125. Thus, an API integration 120 may be configured to interact with a system of record 526 to perform one or more particular operations and/or obtain one or more particular results, and that API integration 120 may describe an integration API EP 115 that the API integration provider service 130 may expose to one or more clients 202 to provide the clients seamless access to such functionality.

The API integration provider service 130 may be local to the client 202 (e.g., on the same local area network) or may be implemented by one or more remove servers 204 (examples of which are described below). The client 202 may communicate with the API integration provider service 130 over one or more computer networks 206 (examples of which are described below). The API integration provider service 130 may communicate with the systems of record 526 over the same or other computer networks. As noted above, the client 202 may access the API integration provider service 130 via the integration API EP(s) 115, and the API integration provider service 130 may access the systems of record 526 via the SOR API EP(s) 125.

The API integration provider service 130 may receive one or more general API calls 104 from the client 202 at one or more integration API EPs 115. The integration API EP 115 may have standardized input/output schemas; for example, that may be independent of input/output schemas used by the SOR API EPs 125. Thus, a client 202 may make API calls in the standardized format independent of which system of record is ultimately accessed. In response to such general API call(s) 104, the first API integration 120*a* may execute the first process and/or the second API integration 120*b* may execute the second process. The API integrations 120 may execute processes to translate or otherwise reformat data from the general API call 104 into a format used by the SOR API EPs 125. Thus, the first API integration 120*a* may execute a first process during which it makes one or more system of record-specific API calls 105 to one or more SOR API EPs 125*a* hosted by the first system of record 526*a*. The second API integration 120*b* may execute a second process during which it makes one or more system of record-specific API calls 106 to one or more SOR API EPs 125*b* hosted by the second system of record 526*b*. As part of the first and/or second processes, the API integration(s) 120 may receive and process response(s) 108, 109 from the system(s) of record 526, and may send a response 107 to the client 202 via the integration API EP 115 that received the general API call 104 from the client 202. In some implementations, the first and/or second processes may translate data in the general API call 104 to match API EP input schema(s) of the SOR API EP(s) 125. The first and/or second processes employed by the API integrations 120 may additionally translate data in the system of record response(s) 108, 109 to match an API EP output schema of the integration API EP 115 to which the client 202 sent the general API call 104.

FIG. 1A shows an example routine 150 that may be performed by the API integration provider service 130. At a step 152 of the routine 150, the API integration provider service 130 may receive, at an integration API EP 115, a first API (general) call 104. The first API call 104 may represent a request to perform a first type of operation (e.g., a search, browse, recent, compare, etc.). In response to receiving the first API call 104, at a step 154 of the routine 150, the API integration provider service 130 may invoke or otherwise initiate the first process of the first API integration 120*a* to send at least a second (system of record-specific) API call 105 to the first system of record API EP 125*a*. At a step 156 of the routine 150, the API integration provider service 130 may receive at least a first response 108 to the second API call 105 from the first system of record 526*a*. At a step 158 of the routine 150, the API integration provider service 130 may send a second response 107 to a source of the first API call 104 (e.g., the client 202). The second response 107 may be based at least in part on the first response 108.

In some implementations, in response to receiving the first API call 104 (per the step 152), the second process of the second API integration 120*b* may additionally be invoked or initiated in a similar fashion. Additionally or alternatively, in some implementations, the second process of the second API integration 120*b* may be invoked in response to a different general API call to a different integration API EP 115. In any event, invoking the second process of the second API integration 120*b* may result in one or more system of record-specific API calls 106 to the second system of record API EP(s) 125*b* of the second system of record 526*b*. The second system of record 526*b* may return at least a third response 109. The second response 107 sent to the client 202 may be further based at least in part on the third response. Alternatively, a separate response 107 that is based at least in part on the third response 109 may be sent to the client 202.

In some implementations, the client 202 may send separate general API calls 104 for respective system of records 526 that are to be accessed via API integrations 120. Alternatively, in some implementations, the client 202 may send a single general API call 104 that may indicate multiple systems of record 526 that are to be accessed via API integrations 120, and the API integration provider service 130 can invoke or execute multiple API integrations 120 in response to receipt of that single general API call 104.

The system 100 may provide responses to different types of general API calls 104. The API EP 115 (or set of API EPs 115) exposed by an API integration 120 may include an on-demand-based API EP 115 or a subscription-based API EP 115. An on-demand-based API EP 115 may implement actions at the time the API is invoked by a user and/or service using the integration platform. For example, a search query is a type of on-demand API call that may receive a direct response in the form of search results. A subscription-based API EP 115 may involve events and/or notifications that a system of record 526 pushes to the API integration provider service 130 after receiving a request (e.g., made via a system of record-specific API call 105) to subscribe to the events/notifications, and that API integration provider service 130, in turn, pushes to the client 202 (e.g., via a second response 107). For example, a user may request notifications when new files are shared with the user. The system of record 526 may not provide a response at the time of receiving the request (or may only acknowledge the request), but may send a notification at a later time if it determines that a new file has been shared.

Integrations hosted in the API integration provider service 130 may be recorded in an API registry. Integrations identified in the API registry may be categorized by API type and/or function (i.e., by a type of operation they can facilitate). Category types may include broadly applicable functionalities such as searching content recent content (e.g., recently accessed applications and/or files), browse content, etc., as well as those that may particular to certain business domains, such as compare files, organize a meeting, electronically sign a document, task management (e.g., schedule a task, begin a task, set or send a reminder, check status of a task), etc. Thus, a client 202 may submit a request to the API integration provider service 130 and/or the API registry to identify resources in the category "search," and the API registry may return a list of one or more integration API EPs 115 categorized accordingly. This categorization of integration API EPs 115 by type, using category tags or otherwise, may thus allow API integrations 120 to be readily discovered by clients 202 once added.

Figure 1B:
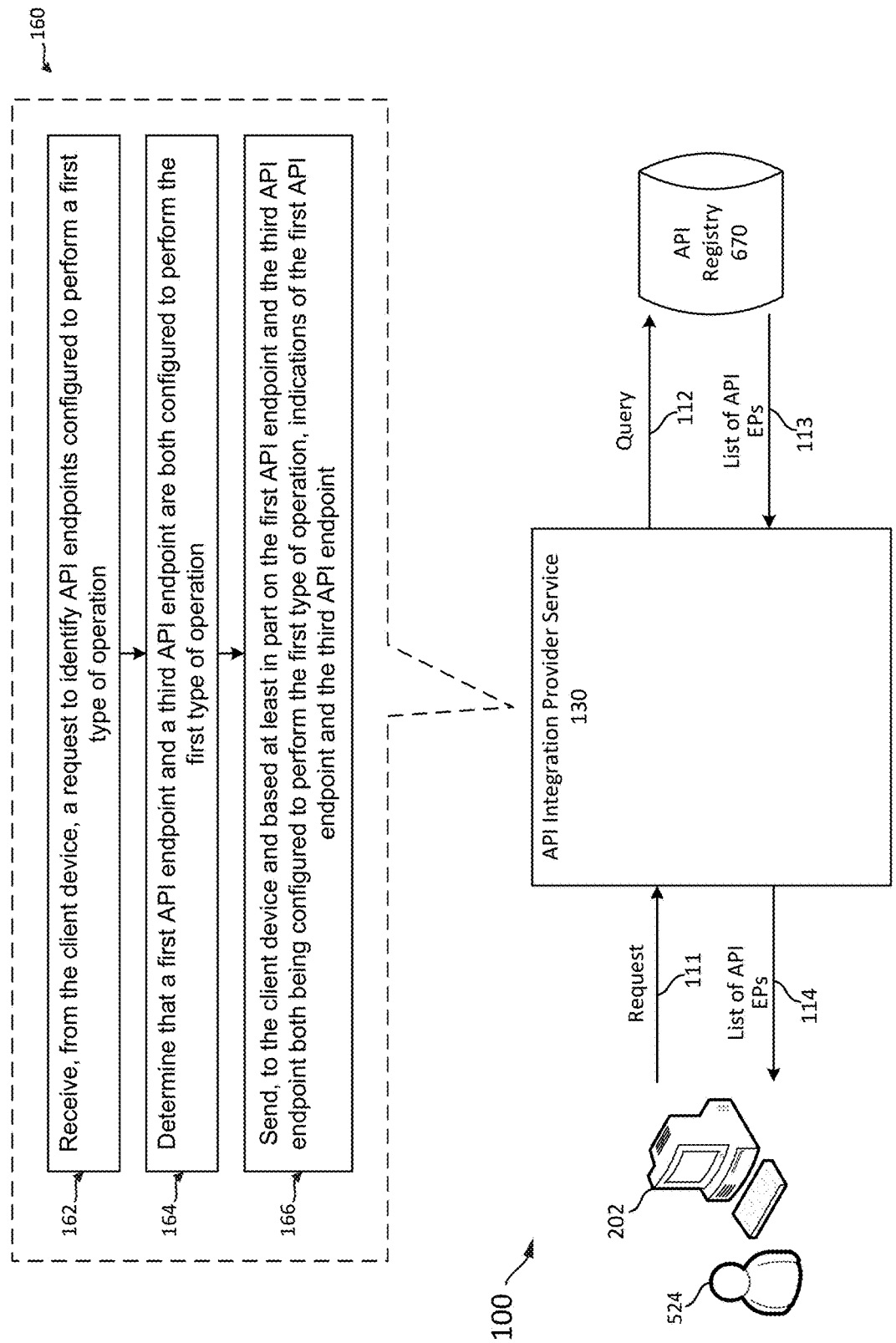
FIG. 1B is a diagram illustrating example operations of the system determining endpoints (EPs) configured to perform certain operations, in accordance with the present disclosure.

FIG. 1B is a diagram illustrating example operations that may be performed by the system 100 to determine integration API EPs 115 configured to perform certain operations, in accordance with some aspects of the present disclosure. In some implementations, a client 202 may send a request 111 to the API integration provider service 130 for indications of available integration API EPs 115 for performing certain types of operations (e.g., search, browse, recent, compare, etc.). As discussed in more detail below in Section F, after API integrations 120 and corresponding integration API EPs 115 have been created, identifiers of the newly-available integration API EPs 115 may be stored in the API registry 670 together with tags or other data indicative of the operations(s) that will be performed with respect to one or more systems of record 526 when general API calls 104 are made to such integration API EPs 115. When the API integration provider service 130 receives a request 111 for integration API EPs 115 available for performing a certain type of operation, the API integration provider service 130 can query the API registry 670 by operation type, and receive an indication, or a list of indications, of integration API EPs 115 available for that type of operation.

FIG. 1B shows an example routine 160 that may be performed by the API integration provider service 130 to provide a client 202 with a list of one or more integration API EPs 115 for performing a certain type of operation. As shown, the client 202 may send a request 111 to the API integration provider service 130 for a list of integration API EPs 115 available for performing a type of operation; for example, a search operation for identifying/locating certain resources by name and/or keyword. The API integration provider service 130 may receive (162) the request 111, and determine (164) one or more integration API EPs 115 for API integrations 120 that are hosted by the API integration provider service 130 and configured to perform the first type of operation. For example, the API integration provider service 130 may send a query 112 to the API registry 670 with an indication of the desired operation type. The API registry 670 may return a list 113 indications of one or more integration API EPs 115 configured to perform the operation type. The API integration provider service 130 may send (166) the list 114 to the client 202. The list of integration API EPs 115 sent to the client 202 may indicate one or more integration API EPs 115 for API integrations 120 that are hosted by the API integration provider service 130; that is, EPs that are available to be called directly by clients 202, such as the integration API EP 115 shown in FIG. 1A. The client 202 may use the list 114 of integration API EPs 115 to determine one or more EPs to which the client 202 may send one or more general API calls 104 corresponding to the operation type.

The API registry 670 may be able to return responses to various types of queries concerning API integrations 120 and/or integration API endpoints 115. For example, the API registry 670 may provide information such as which systems of record 526 are associated with integrations 120 that support a particular operation, e.g., a "search" operation, what API integrations 120 are available for a particular system or record 526, what events (e.g., related to subscription API calls) may be supported by an API integration for a system of record 526, what capabilities of systems of record 526 are exposed via integration API EPs 115 by the API integration provider service 130, etc. The API registry 670 may itself be exposed via one or more standardized APIs, allowing a user 524 and/or client 202 to directly query what API integrations 120 may be available. These API registry 670 API may thus allow clients 202 of the system 100 to discover available API integrations 120 and/or integration API EPs 115.

API integrations may be composed of several components that are supported by representational state transfer (REST) APIs. The components may include a property describing the API integration 120, executable code such as scripts for performing processes, and/or definitions of the system of record API EPs 125 (e.g., including a URL, the system of record 526, HTTP verb(s) available, input schema, output schema, category, etc.). An API integration 120 may be accessed via one or more integration API EPs 115. An integration API EP 115 of an API integration 120 may be assigned a general API call 104 depending on its type. The integration API endpoints 115 may be made available to any of a number of types of clients 202, such as user-operated computing devices or systems, applications (e.g., a resource access application, a search or other content service, etc.), and/or microapps such as those discussed in Section E below. B. Network Environment Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Figure 2:
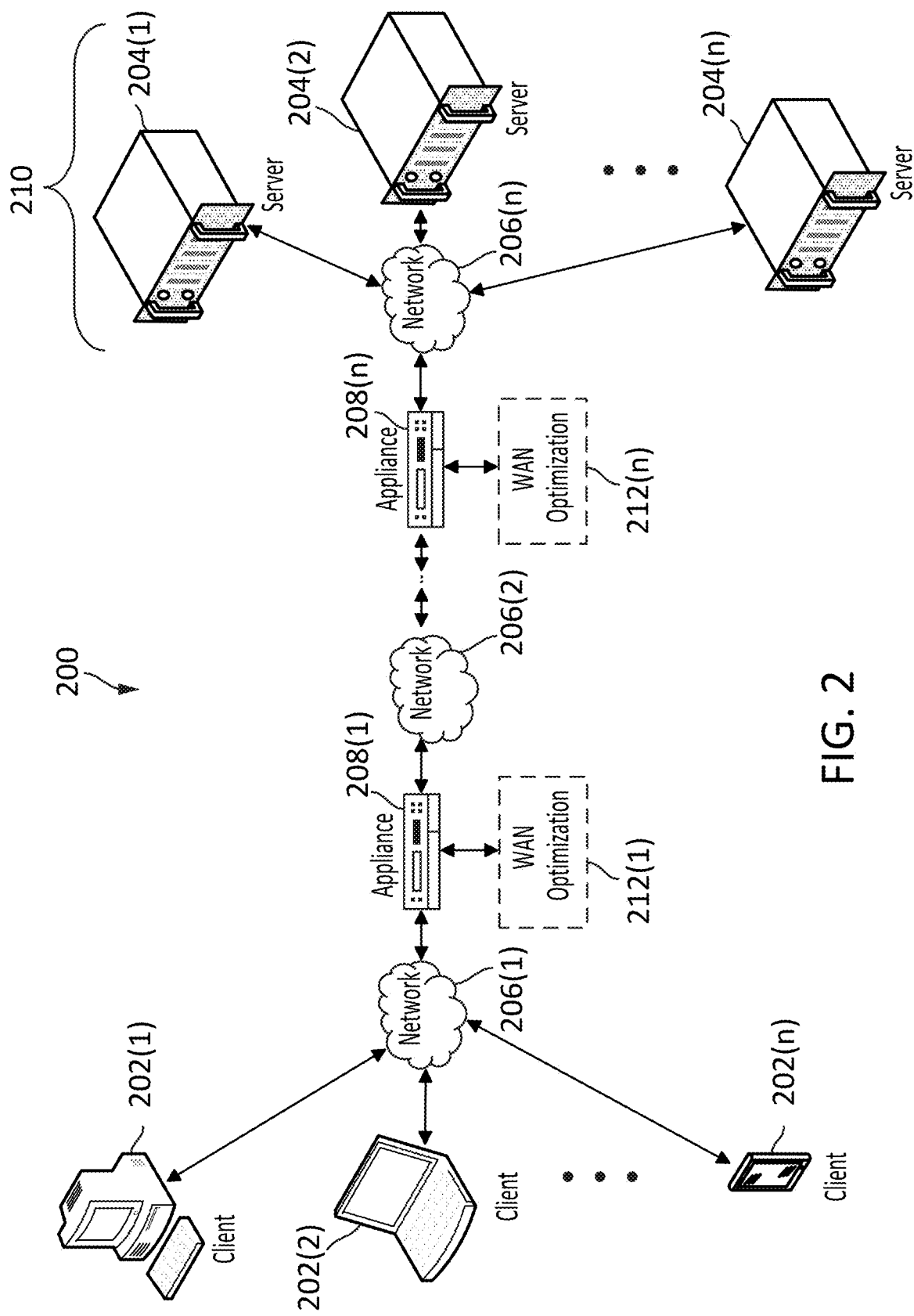
FIG. 2 is a diagram of a network environment in which some embodiments of the context-based microapp action recommendation system disclosed herein may deployed.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, BLUETOOTH protocol, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by CITRIX Systems, Inc., of Fort Lauderdale, FL, such as CITRIX GATEWAY™ services or CITRIX ADC™ application delivery controller.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ACTIVEX control; a JAVA applet; software related to voice over internet protocol (VoIP) communications like a soft IP telephone; an application for streaming video and/or audio; an application for facilitating real-time-data communications; a HTTP client; a FTP client; an OSCAR client; a TELNET client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

Figure 3:
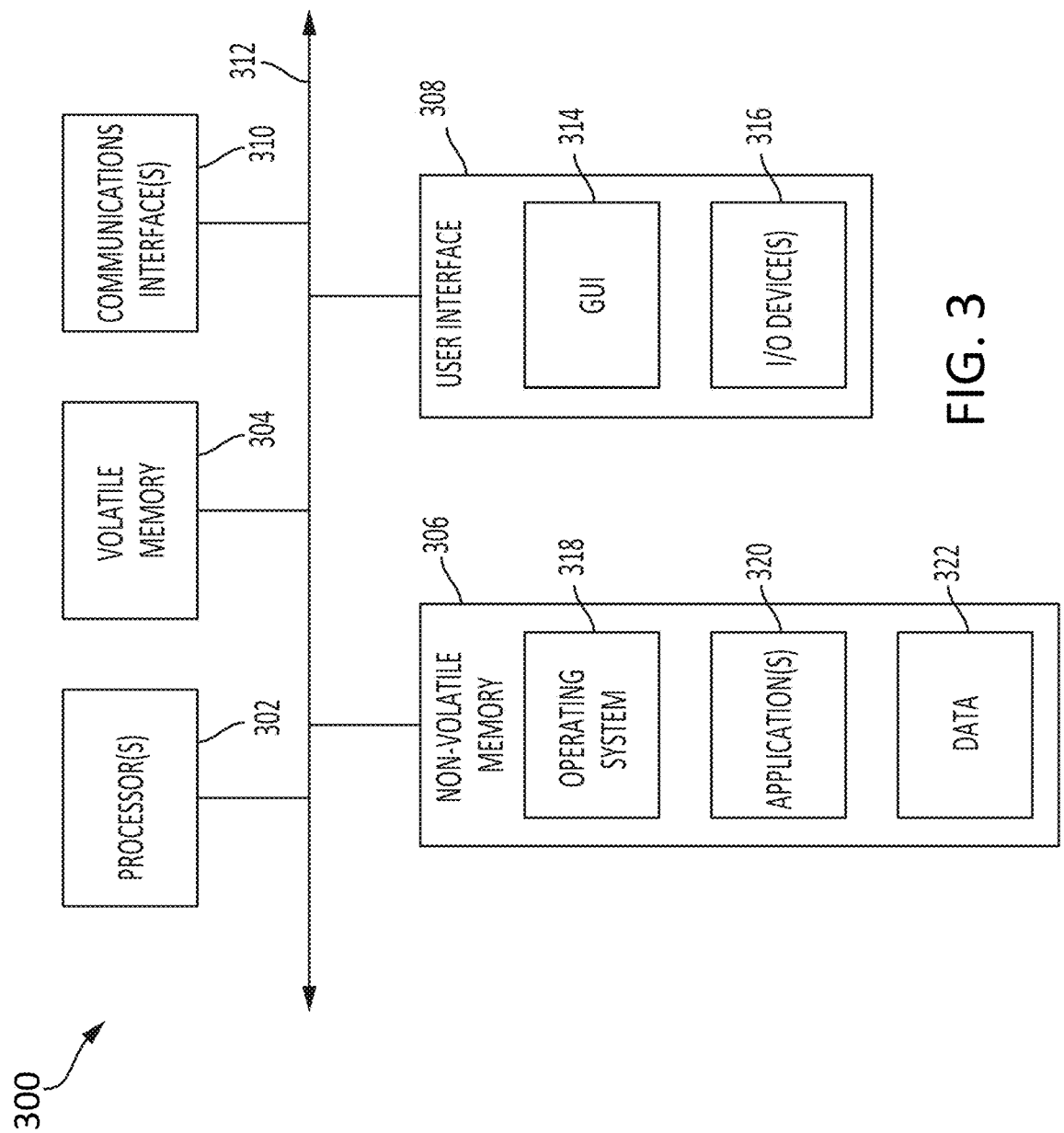
FIG. 3 is a block diagram of a computing system that may be used to implement one or more of the components of the computing environment shown in FIG. 2 in accordance with some embodiments.

In some embodiments, one or more of the appliances 208, 212 may be implemented as products sold by CITRIX Systems, Inc., of Fort Lauderdale, FL, such as CITRIX SD-WAN or CITRIX Cloud systems and services. For example, in some implementations, one or more of the appliances 208, 212 may be cloud connectors that enable communications to be exchanged between resources within a cloud computing environment and resources outside such an environment, e.g., resources hosted within a data center of+ an organization. C. Computing Environment FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

Figure 4:
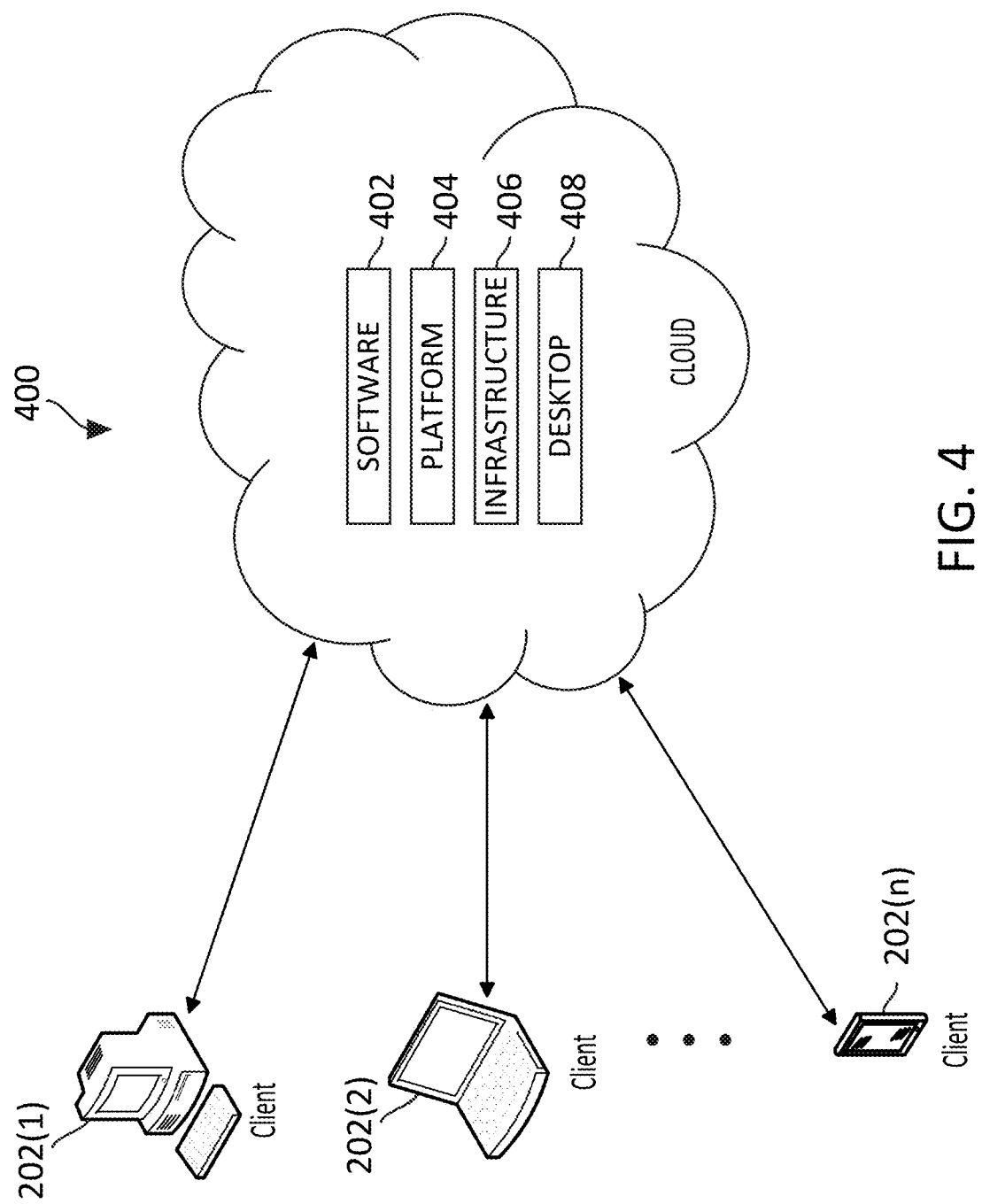
FIG. 4 is a schematic block diagram of a cloud computing environment in which various aspects of the disclosure may be implemented.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of. one or more applications, one or more desktop applications, and one or more desktop sessions in which one or more applications may execute. D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, CITRIX Gateway, provided by CITRIX Systems, Inc., may be deployed on-premises or on public clouds to provide users with secure access and single sign-on to virtual, SaaS and web applications. Furthermore, to protect users from web threats, a gateway such as CITRIX Secure Web Gateway may be used. CITRIX Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as CITRIX Provisioning Services (CITRIX PVS). CITRIX PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by AMAZON.COM, Inc., of Seattle, Washington, AZURE IaaS services provided by MICROSOFT Corporation or Redmond, Washington, RACKSPACE CLOUD systems and services provided by RACKSPACE US, Inc., of San Antonio, Texas, GOOGLE Compute Engine provided by GOOGLE Inc. of Mountain View, California, and RIGHTSCALE systems and services provided by RIGHTSCALE, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE services provided by MICROSOFT Corporation of Redmond, Washington, GOOGLE App Engine provided by GOOGLE Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by GOOGLE Inc., SALESFORCE systems and services provided by SALESFORCE.COM Inc. of San Francisco, California, or OFFICE 365 provided by MICROSOFT Corporation. Examples of SaaS may also include data storage providers, e.g. CITRIX ShareFile 8' from CITRIX Systems, DROPBOX provided by Dropbox, Inc. of San Francisco, California, MICROSOFT SKYDRIVE provided by MICROSOFT Corporation, GOOGLE Drive provided by GOOGLE Inc., or APPLE ICLOUD services provided by APPLE Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. CITRIX Cloud from CITRIX Systems is one example of a DaaS delivery platform. DaaS delivery platforms may be hosted on a public cloud computing infrastructure, such as AZURE CLOUD services from MICROSOFT Corporation of Redmond, Washington, or AMAZON WEB SERVICES provided by AMAZON.COM, Inc., of Seattle, Washington, for example. In the case of CITRIX Cloud, CITRIXCITRIX WORKSPACE app may be used as a single-entry point for bringing apps, files and desktops together (whether on-premises or in the cloud) to deliver a unified experience. E. Systems and Methods for Managing and Streamlining Access by Client Devices to a Variety of Resources.

Figure 5A:
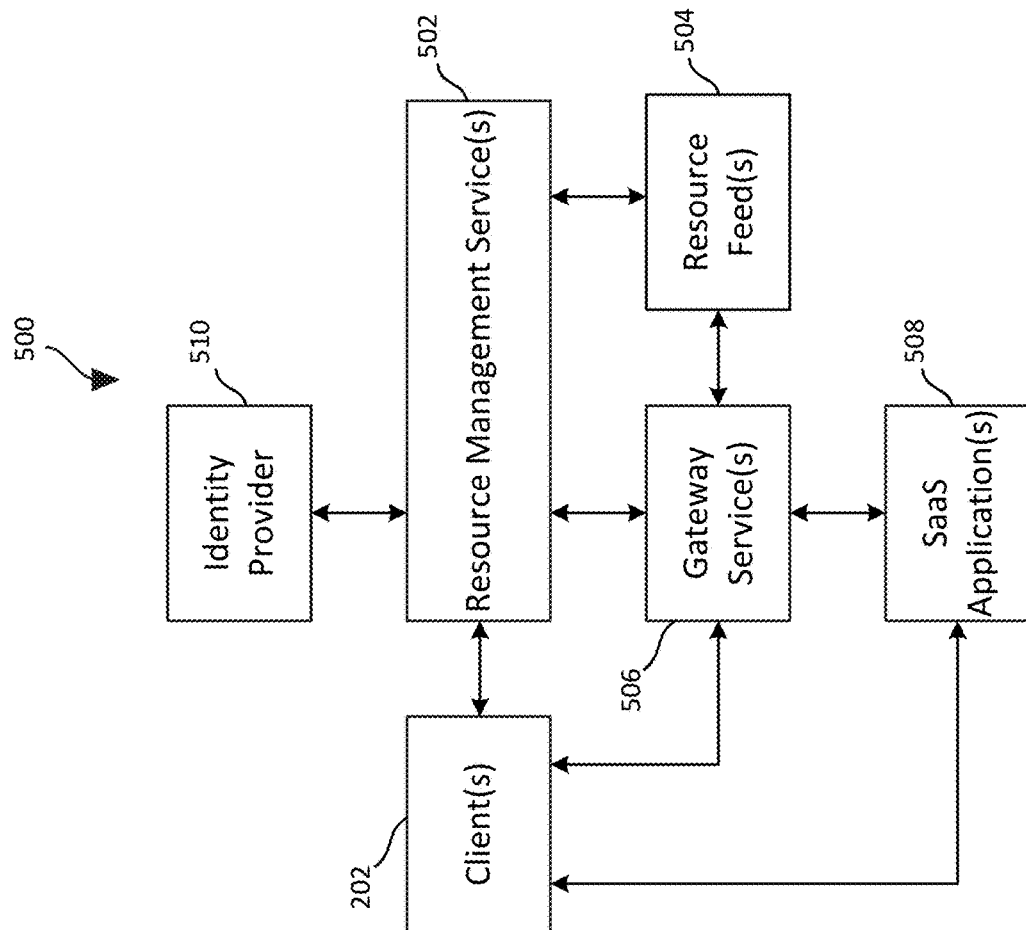
FIG. 5A is a block diagram of an example system in which resource management services may manage and streamline access by clients to resource feeds (via one or more gateway services) and/or software-as-a-service (SaaS) applications.

FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
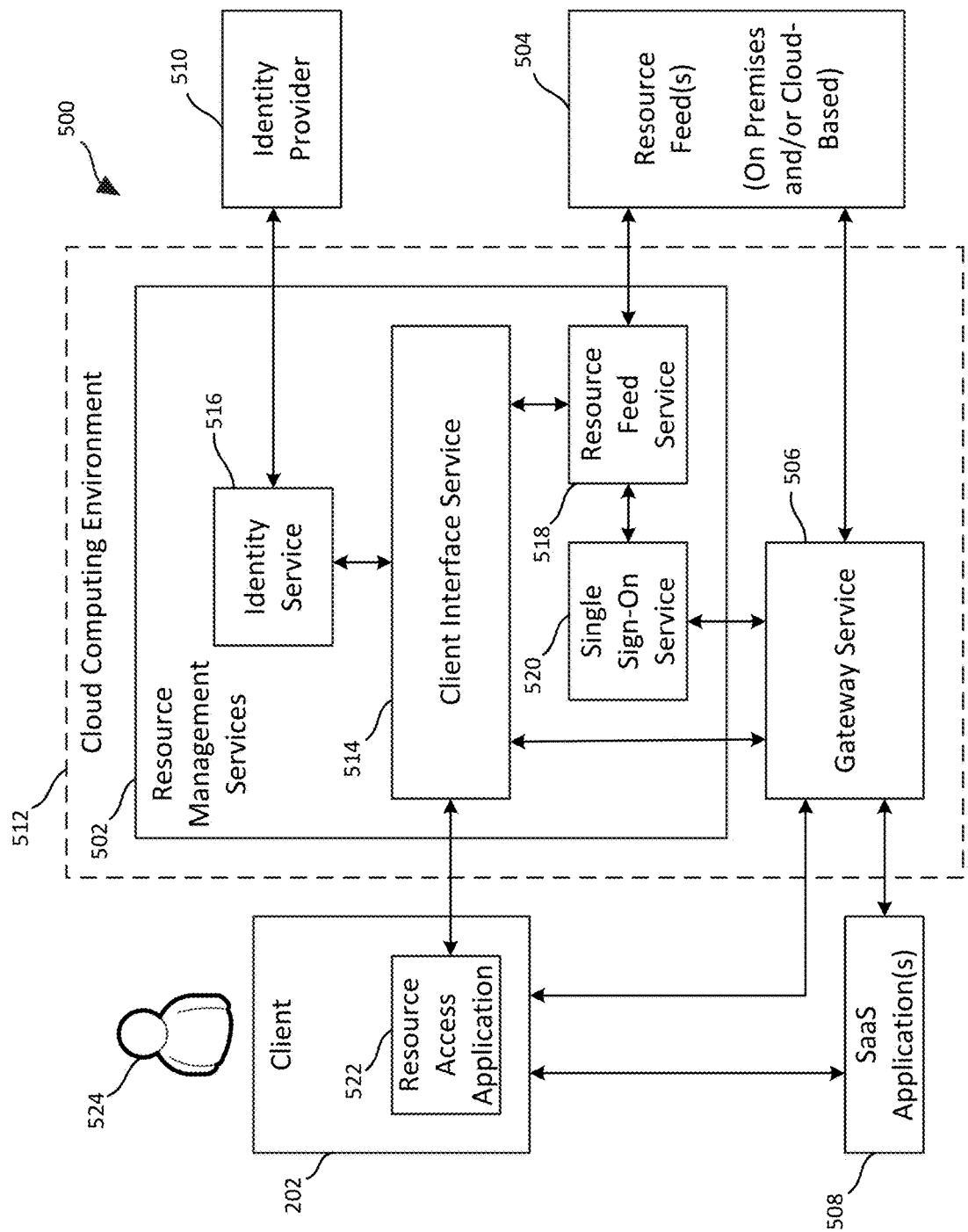
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include MICROSOFT AZURE Cloud services, AMAZON WEB SERVICES, GOOGLE Cloud service, or IBM Cloud services. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, CITRIX Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., username and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a MICROSOFT AZURE Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., CITRIX Virtual Apps and Desktops™, VMware Horizon, MICROSOFT RDS, etc.), one or more file repositories and/or file sharing systems (e.g., ShareFile 8', one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include MICROSOFT Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520.

The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources-SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
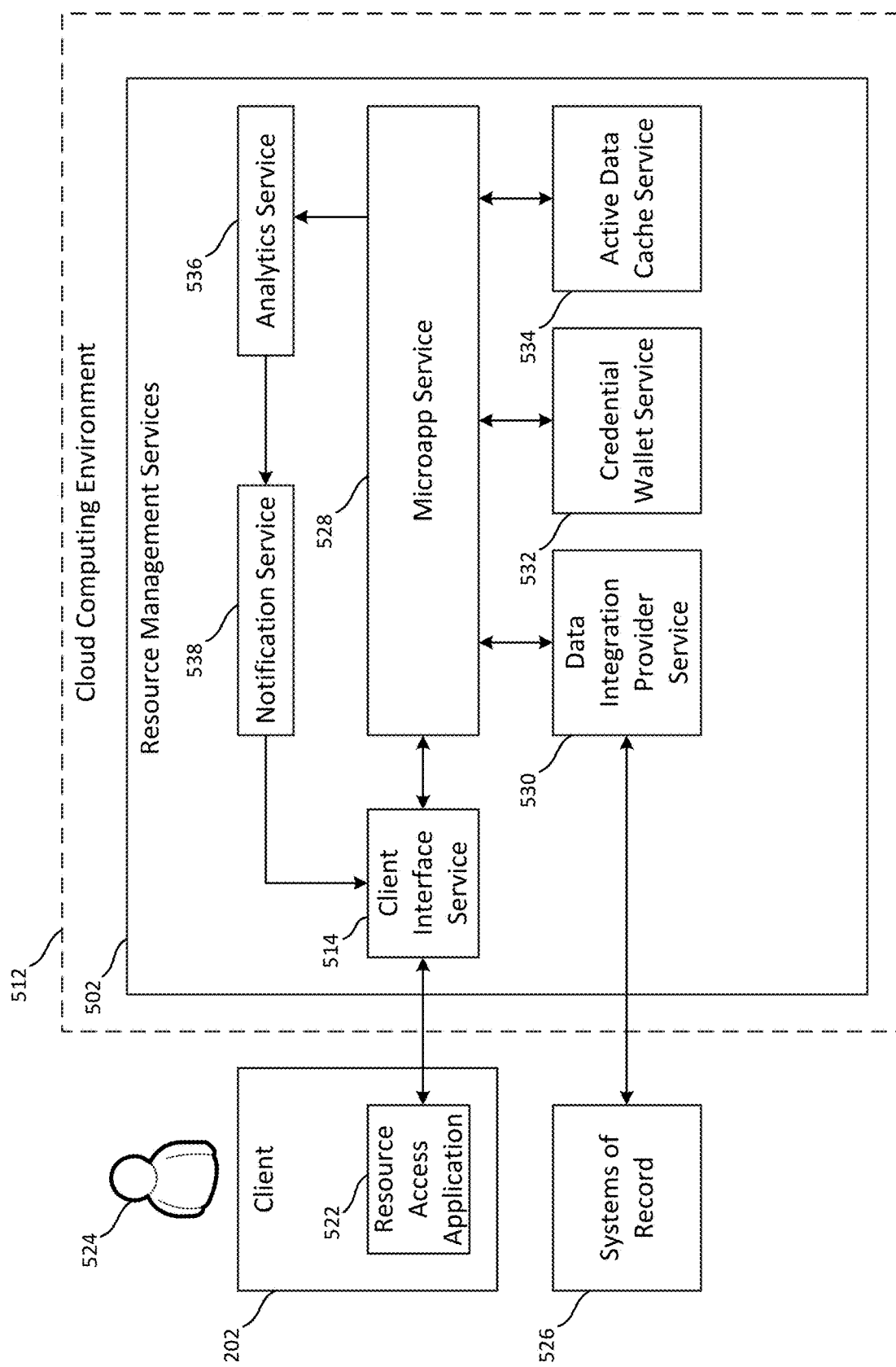
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and XML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as MICROSOFT Teams. This feature may allow employees to work efficiently, stay organized, and deliver only the specific information they're looking for.

Figure 5D:
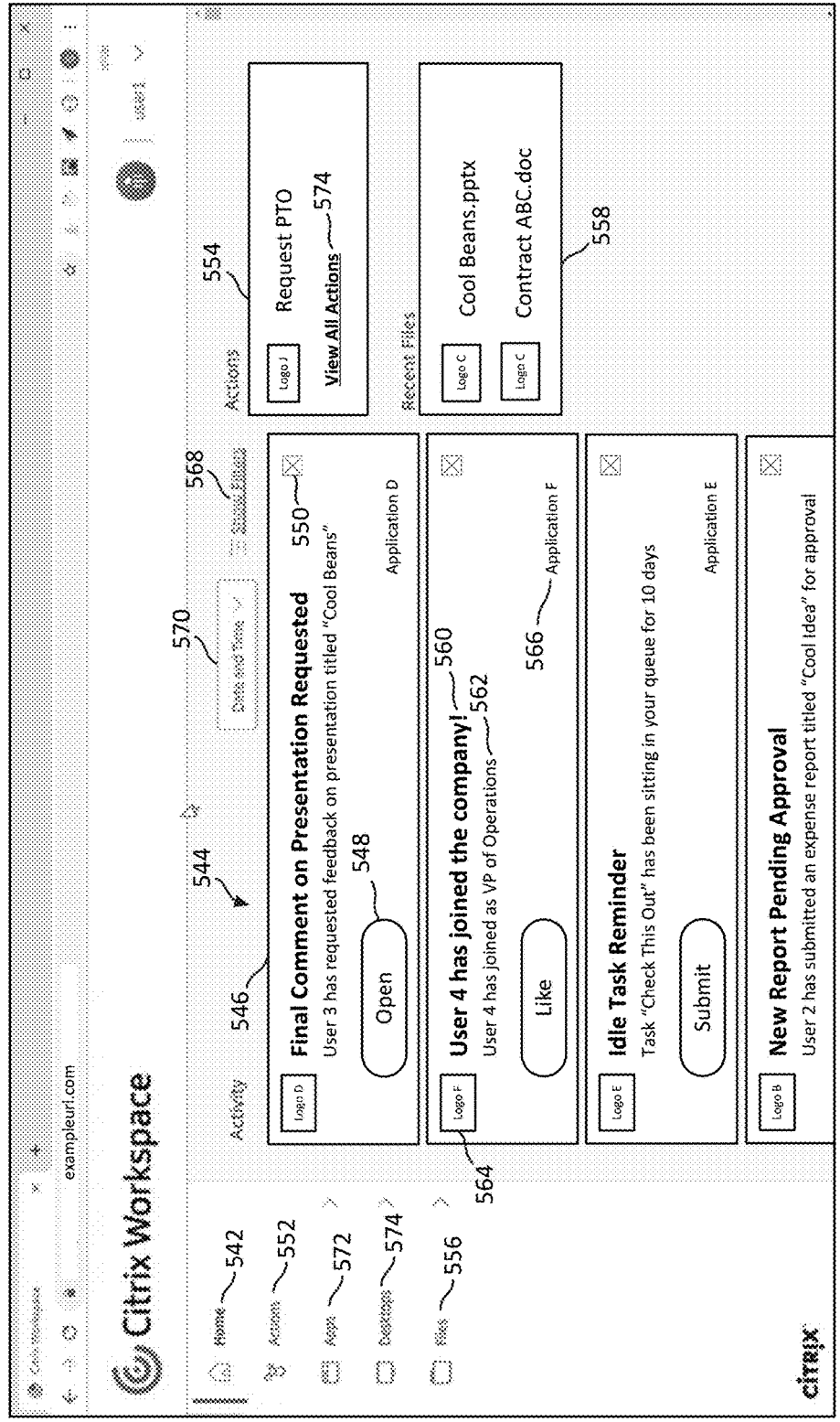
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, Rightsignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system of record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp.

In addition to the event-driven actions accessible via the action elements 548 in the notifications 546, a user may alternatively initiate microapp actions by selecting a desired action, e.g., via a drop-down menu accessible using the "action" user interface element 552 or by selecting a desired action from a list 554 of available microapp actions. In some implementations, the various microapp actions available to the user 524 logged onto the multi-resource access system 500 may be enumerated to the resource access application 522, e.g., when the user 524 initially accesses the system 500, and the list 554 may include a subset of those available microapp actions. The available microapp actions may, for example, be organized alphabetically based on the names assigned to the actions, and the list 554 may simply include the first several (e.g., the first four) microapp actions in the alphabetical order. In other implementations, the list 554 may alternatively include a subset of the available microapp actions that were most recently or most commonly accessed by the user 524, or that are preassigned by a system administrator or based on some other criteria. The user 524 may also access a complete set of available microapp actions, in a similar manner as the "action" user interface element 552, by clicking on the "view all actions" user interface element 574.

As shown, additional resources may also be accessed through the screen 540 by clicking on or otherwise selecting one or more other user interface elements that may be presented on the screen. For example, in some embodiments, the user may also access files (e.g., via a CITRIX ShareFile 8' platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a CITRIX Virtual Apps and Desktops™ service) by clicking on or otherwise selecting an "apps" user interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a CITRIX Virtual Apps and Desktops™ service) by clicking on or otherwise selecting a "desktops" user interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications. F. Detailed Description of Example Embodiments of the System for Facilitating Access to API Integrations Introduced in Section A.

Figure 6:
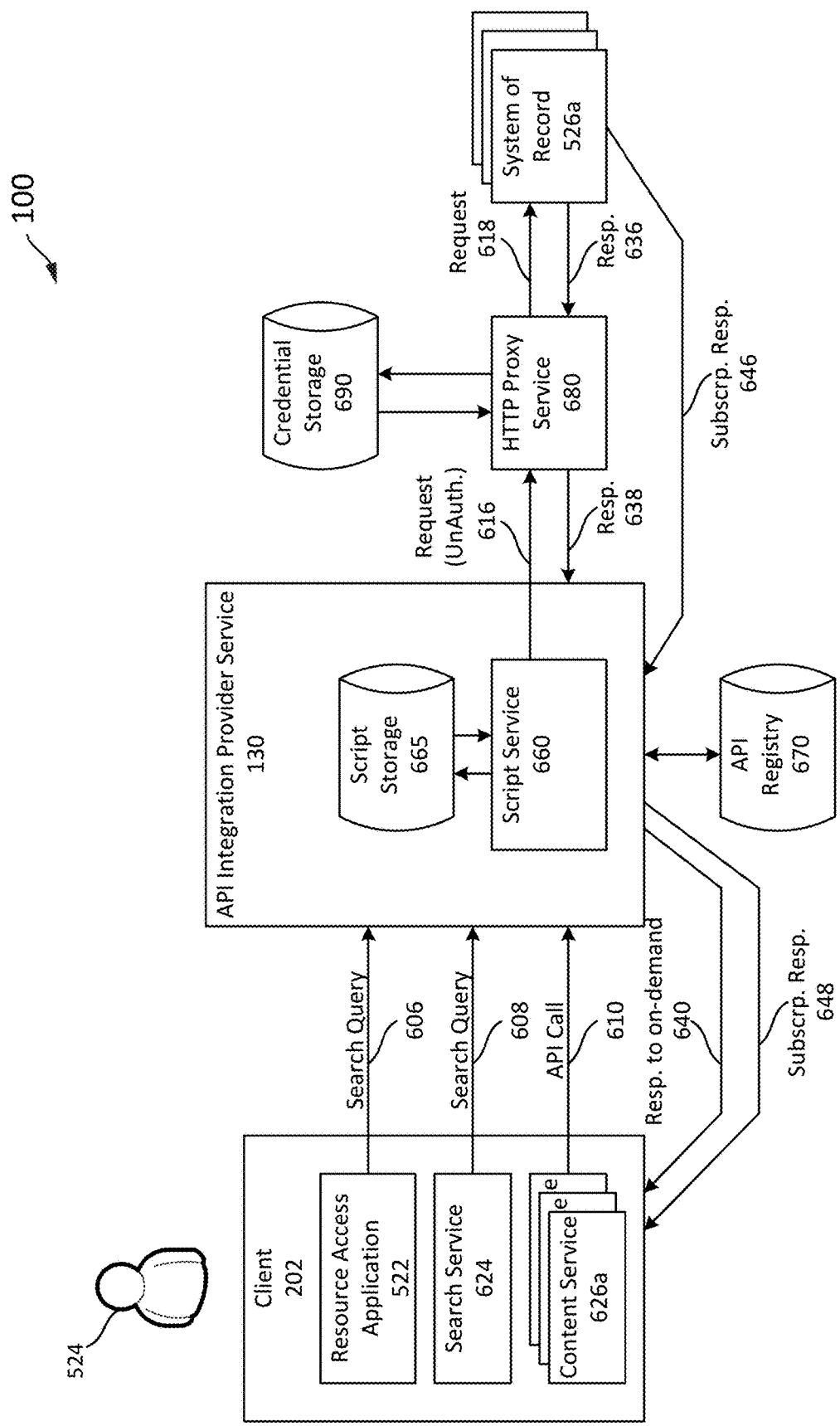
FIG. 6 is a block diagram of an example system in which a data integration provider service hosts integrations for providing a client with access to systems of record.

FIG. 6 is a block diagram of an example system in which an API integration provider service 130 hosts API integrations for providing a client 202 with access to particular functionalities or data of systems of record 526. As shown, a client 202 (which may or may not be operated by a user 524) may access the API integration provider service 130. The API integration provider service 130 may provide the client 202 with seamless access to various functionalities or data of one or more systems of record 526*a*, 526*b*, and/or 526*c* (collectively "systems of record 526"). The client 202 may execute one or more applications and/or other services that may communicate with the integration API EPs 115 (shown in FIG. 1A) provided by the API integration provider service 130. As illustrated, examples of such applications/services may include a resource access application 522 (e.g., as shown in FIG. 5B), a search service 624, and one or more additional content services 626*a*, 626*b*, and/or 626*c* (collectively "content services 626").

An application and/or service may send one or more general API calls 104 to the API integration provider service 130 (e.g., to an integration API EP 115). For example, and without limitation, the resource access application 522 and/or the search service 624 may send general API calls 104 representing search queries 606 and/or 608, and/or one of the content services 626 may send an API call 610 for a different purpose, etc. The API integration provider service 130 may receive such API call(s) and, based on an indication therein, determine an API integration 120 to invoke to, among other things, send one or more requests (e.g., to SOR API EP(s) 125) to the appropriate system of record 526. The API integration provider service 130 may include a script service 660 that may execute one or more scripts or other executable code to carry out an API integration process. The script service 660 may retrieve a script corresponding to the API integration 120 from a script storage 665. The script service 660 may execute the script to generate and send one or more HTTP calls, such as a request 616, to the system of record 526 (e.g., to one or more SOR API EP(s) 125 of the system of record 526).

In some implementations, such a request 616 may not include a credential (or other authorization) corresponding to the client 202 (and/or the user 524). Thus, the request 616 may not include a personal authorization for accessing the system of record 526, but rather may include credentials for an administrator account of the organization or other custodian of the API integration provider service 130. This may, however, result in losing accountability over the request such that the system of record 526 may be unable to provide a response that is based on a user or client's profile information. To provide such accountability, the system 100 may use an HTTP proxy service 680 to add user- and/or client-specific credentials to the HTTP request. In some implementations, for example, the HTTP proxy service 680 may retrieve user/client credentials from a credential storage 690. In some implementations, the credential storage 690 may be, for example, the wallet service 532 or similar service. The HTTP proxy service 680 may forward the request 618, now authenticated, to the system of record 526.

The systems of record 526 may handle different types of API calls. For example, a first system of record 526a may process on-demand API calls in which a single response is returned directly in response to the request 618. A second system of record 526b may process subscription API calls in which one or multiple responses are returned at some time following the request 618 and upon some other trigger. For example, the user 524 may subscribe to notifications for an event or type of event. In some implementations, a same system of record 526 may process both on-demand and subscription API calls.

In the case of an on-demand API call (e.g., a search query 606 or 608), the system of record 526 may return a response 636, which the HTTP proxy service 680 may forward to the API integration provider service 130 as a response 638. The API integration provider service 130 may return a response 640 to the on-demand API call from the client device 202.

In the case of a subscription API call, the system of record 526 may return a response 646 that may bypass the HTTP proxy service 680 en route to the API integration provider service 130. The API integration provider service 130 may return the subscription response 648 to the client 202. The system of record 526 may continue to send responses following individual triggers/events until and/or unless the subscription is canceled (e.g., by the user 524).

Figure 7:
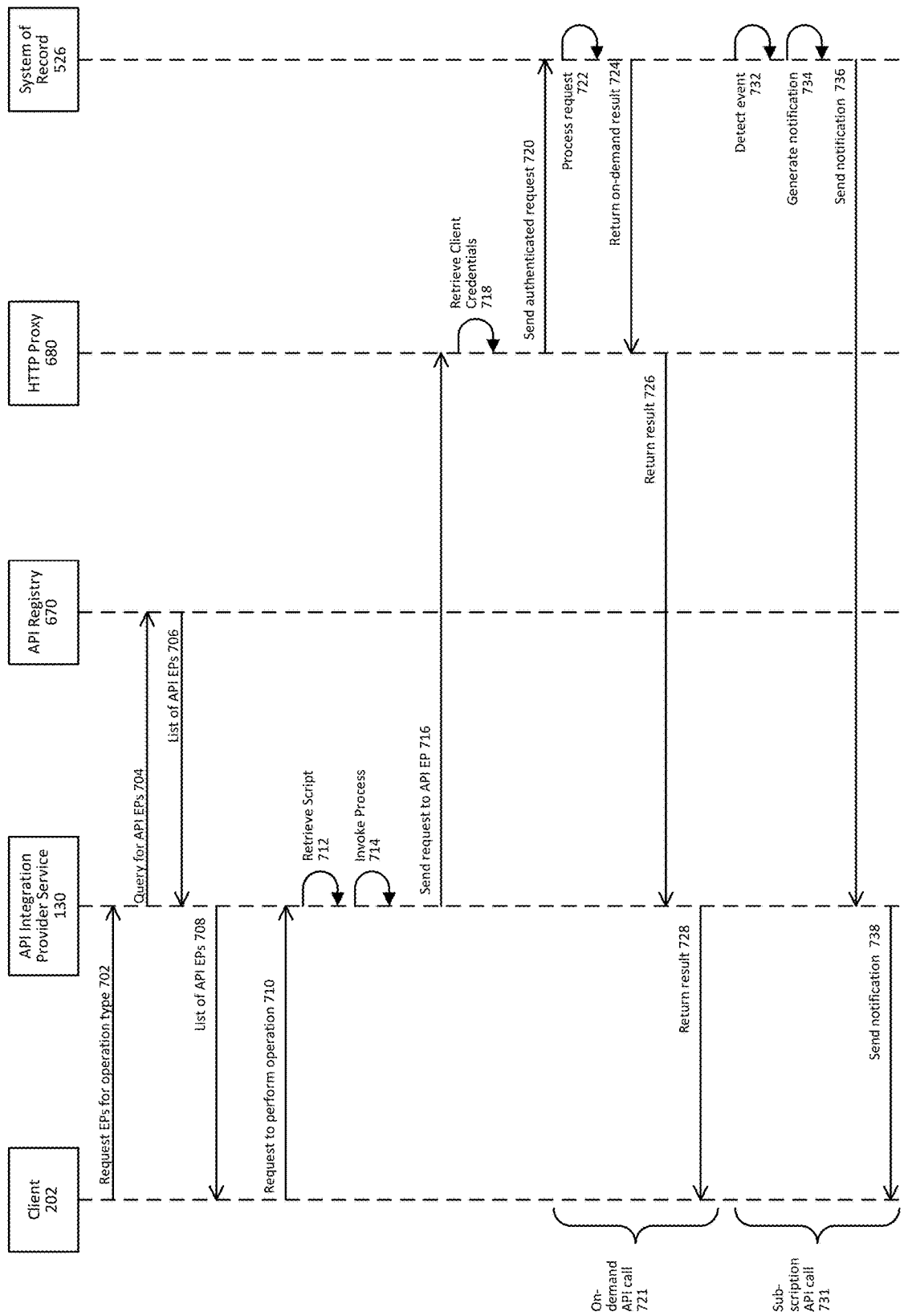
FIG. 7 shows a sequence diagram illustrating messages that may be exchanged amongst various components of a system for facilitating access to API integrations to enable certain aspects of the functionality disclosed herein.

FIG. 7 shows a sequence diagram illustrating messages that may be exchanged amongst various components of the system 100 to enable certain aspects of the functionality disclosed herein. Section A introduced systems for facilitating access to API integrations 120 hosted by an integration provider service 130. As explained in Section A, an API integration provider service 130 may host API integrations 120 corresponding to various systems of record 526. The API integration provider service 130 may provide one or more integration API EPs 115 to which clients 202 may send general API requests 104. Clients 202 may access the integration API EPs 115 to invoke one or more processes of the API integration(s) 120 provided by the API integration provider service 130. In accordance with such process(es), the API integration 120 may make one or more system of record-specific API calls 105, 106 to one or more systems of record 526 (e.g., to one or more SOR API EP(s) 125) on behalf of the client 202. The sequence diagram shown in FIG. 7 illustrates messages that may be exchanged among the client 202, the API integration provider service 130, the API registry 670, the HTTP proxy service 680, and a system of record 526, to enable certain aspects of the functionality described in Section A.

As shown in FIG. 7, a client may send (702) a request for a list of integration API EPs 115 made available by the API integration provider service 130 for performing a certain type of operation related to resources accessible by the API integration provider service 130 (e.g., search, recent, browse, compare, etc.). The system 100 may maintain a list of API integrations and/or integration API EPs 115 in the API registry 670. The API integration provider service 130 may query (704) the API registry 670 for a list of API integrations 120 and/or integration API EPs 115 corresponding to the type of operation indicated in the request. The API registry 670 may return (706) a list of API integrations 120 and/or integration API EPs 115 associated with that type of operation. The API integration provider service 130 may return (708) the list of API integrations 120 and/or integration API EPs to the client 202. In some implementations, the client 202 may additionally or alternatively query the API registry 670 directly.

The client 202 (in response to user input or otherwise) may select one or more integration API EPs 115 to call to perform a certain type of operation. The client 202 may send (710) one or more requests to perform the operation to the API integration provider service 130. The API integration provider service 130 may, based on the request(s), determine one or more API integrations 120 indicated in the request(s). The API integration provider service 130 may retrieve (712) a script or other executable code (e.g., from the script storage 665). The script service 660 may invoke (714) a process for handing the client's API call by executing the retrieved script. The script may generate one or more requests to be sent to the SOR API EP 125. The API integration provider service 130 may send (716) such request(s) to the system of record 526 indicated in the API integration 120.

In some implementations, the API integration provider service 130 may send the request(s) via an HTTP proxy service 680. The HTTP proxy service 680 may authenticate the request(s) such that the system of record 526 can process the request(s) on behalf of a particular user (e.g., the user 524, rather than on behalf of an administrator account). The HTTP proxy service 680 may receive the request(s) and retrieve (718) credentials associated with a user indicated in the request(s). The HTTP proxy service 680 may retrieve the credentials from, for example, the credential storage 690. The HTTP proxy service 680 may generate the authenticated request(s) using the credentials, and send (720) the authenticated request(s) to the system of record 526.

The system of record 526 may receive and process (722) the request(s) to generate one or more results to be returned to the API integration provider service 130. The system of record 526 may process different types of API calls such as on-demand API calls and subscription API calls. An on-demand API call may result in a direct response; for example, the system of record 526 may process the API call, generate a response, and provide the response without delay. Such an on-demand API call may be a search query, changing a setting related to an application, retrieving a document, etc. In the case of an on-demand API call (721), the system of record 526 may process (722) the request(s), return (724) the response(s) via (726) the HTTP proxy service 680 to the API integration provider service 130, which may return (728) a response to the requesting client 202.

A subscription API call may result in one or more future responses; for example, the system of record 526 may send notifications upon the occurrence of a triggering event, such as when a file or file folder is created, modified, and/or accessed. In the case of subscription API call (731), the system of record 526 may store data related to the request and, upon detection (732) of a subscription event, generate (734) a notification. The system of record 526 may send (736) the notification (e.g., bypassing the HTTP proxy service 680) to the API integration provider service 130, which may send (738) the notification to the requesting client 202. G. Example Implementations of Methods, Systems, and Computer-Readable Media in Accordance with the present disclosure.

The following paragraphs (M1) through (M12) describe examples of methods that may be implemented in accordance with the present disclosure.

(M1) A method may be performed that involves receiving, by a computing system from a first device, a request to identify application programming interface (API) endpoints that are configured to perform a search operation; determining, by the computing system, that first and second API endpoints of the computing system are both configured to perform search operation operations; sending, from the computing system to the first device and based at least in part on the first and second API endpoints both being configured to perform search operations, indications of the first API endpoint and the second API endpoint; receiving, at the first API endpoint and from the first device, a first API call requesting performance of a first search operation; executing, by the computing system and based on the first API call, a first script to send at least a second API call to a third API endpoint of a first system of record, the second API call representing a request to perform the first search operation; receiving, by the computing system and from the first system of record, first search results in response to the second API call; generating, by the computing system and based at least in part on the first search results, a first response to the first API call, the first response representing the first search results; sending, from the computing system to the first device, the first response; receiving, at the second API endpoint and from the first device, a third API call requesting performance of a second search operation; executing, by the computing system and based on the third API call, a second script to generate at least a fourth API call to a fourth API endpoint of a second system of record, the fourth API call representing a request to perform the second search operation; receiving, by the computing system and from the second system of record, second search results in response to the fourth API call; generating, by the computing system and based at least in part on the second search results, a second response to the third API call, the second response representing the second search results; and sending, from the computing system to the first device, the second response.

(M2) A method may be performed that involves receiving, at a first application programming interface (API) endpoint of a computing system, a first API call requesting performance of a first type of operation; invoking, by the computing system and based on the first API call, a first process to send at least a second API call to a second API endpoint of a first system of record; receiving, by the computing system and from the first system of record, a first response to the second API call; and sending, from the computing system to a source of the first API call, a second response that is based at least in part on the first response.

(M3) A method may be performed as described in paragraph (M2), and may further involve receiving, by the computing system and from the first device, a request to identify API endpoints configured to perform the first type of operation; determining, by the computing system, that the first API endpoint is configured to perform the first type of operation; and sending, from the computing system to the first device and based at least in part on the first API endpoint being configured to perform the first type of operation, an indication of the first API endpoint.

(M4) A method may be performed as described in paragraph (M3), wherein determining that the first API endpoint is configured to perform the first type of operation may further involve determining that the request includes a first indicator of the first type of operation; determining that the first API endpoint is associated with the first indicator; and determining, based at least in part on the request including the first indicator and the first API endpoint being associated with the first indicator, that the first API endpoint is configured to perform the first type of operation.

(M5) A method may be performed as described in paragraph (M4), and may further involve, prior to receiving the request, receiving, from a second device, an indication that first API endpoint is configured to perform the first type of operation; and storing, by the computing system and based at least in part on the first API endpoint being configured to perform the first type of operation, a second indicator in association with the first API endpoint; wherein determining that the first API endpoint is associated with the first indicator further comprises determining that the second indicator corresponds to the first indicator.

(M6) A method may be performed as described in any of paragraphs (M2) through (M5), and may further involve determining, by the computing system, access credentials associated with a user of the source of the first API call; and using the access credentials to make the second API call.

(M7) A method may be performed as described in any of paragraphs (M2) through (M6), wherein the first API endpoint has a first input schema, the second API endpoint has a second input schema that is different than the first input schema, and invoking the first process may further involve generating, by the computing system, the second API call according to the second input schema.

(M8) A method may be performed as described in any of paragraphs (M2) through (M7), wherein the first API endpoint has a first output schema, the second API endpoint has a second output schema that is different than the first output schema, and generating the second response may further involve generating, by the computing system, the second response in accordance with the first output schema.

(M9) A method may be performed as described in any of paragraphs (M2) through (M8), and may further involve receiving, at a third API endpoint of the computing system, a third API call requesting performance of the first type of operation; invoking, by the computing system and based on the third API call, a second process to generate at least a fourth API call to a fourth API endpoint of a second system of record; receiving, by the computing system and from the second system of record, a third response to the fourth API call; generating, by the computing system and based at least in part on the third response, a fourth response to the third API call; and sending, from the computing system to a source of the third API call, the fourth response.

(M10) A method may be performed as described in (M9), wherein the first API call and the third API call originate from a first device, and the method may further involve receiving, by the computing system and from the first device, a request to identify API endpoints configured to perform the first type of operation; determining, by the computing system, that the first API endpoint and the third API endpoint are both configured to perform the first type of operation; and sending, from the computing system to the first device and based at least in part on the first API endpoint and the third API endpoint both being configured to perform the first type of operation, indications of the first API endpoint and the third API endpoint.

(M11) A method may be performed as described in (M10), wherein determining that the first API endpoint and the third API endpoint are both configured to perform the first type of operation may further involve determining that the request includes a first indicator of the first type of operation; determining that the first API endpoint is associated with the first indicator; determining that the third API endpoint is associated with the first indicator; and determining, based at least in part on the request including the first indicator and the first API endpoint and the third API endpoint both being associated with the first indicator, that the first API endpoint and the third API endpoint are both configured to perform the first type of operation.

(M12) A method may be performed as described in (M11), and may further involve prior to receiving the request, receiving a first indication that first API endpoint is configured to perform the first type of operation; storing, by the computing system and based at least in part on the first API endpoint being configured to perform the first type of operation, a second indicator in association with the first API endpoint; prior to receiving the request, receiving a second indication that third API endpoint is configured to perform the first type of operation; and storing, by the computing system and based at least in part on the third API endpoint being configured to perform the first type of operation, a third indicator in association with the third API endpoint; wherein determining that the first API endpoint is associated with the first indicator further comprises determining that the second indicator corresponds to the first indicator, and determining that the third API endpoint is associated with the first indicator further comprises determining that the third indicator corresponds to the first indicator.

The following paragraphs (S1) through (S11) describe examples of systems and devices that may be implemented in accordance with the present disclosure.

(S1) A system may comprise at least one processor, and at least one computer-readable medium encoded with instructions which, when executed by the at least one processor, cause the system to receive, at a first application programming interface (API) endpoint of the system, a first API call requesting performance of a first type of operation; invoke, based on the first API call, a first process to send at least a second API call to a second API endpoint of a first system of record; receive, from the first system of record, a first response to the second API call; and send, to a source of the first API call, a second response that is based at least in part on the first response.

(S2) A system may be configured as described in paragraph (S1), and the at least one computer-readable medium may be further encoded with additional instructions which, when executed by the at least one processor, further cause the system to receive, from the first device, a request to identify API endpoints configured to perform the first type of operation; determine that the first API endpoint is configured to perform the first type of operation; and send, to the first device and based at least in part on the first API endpoint being configured to perform the first type of operation, an indication of the first API endpoint.

(S3) A system may be configured as described in paragraph (S2), and the at least one computer-readable medium may be further encoded with additional instructions which, when executed by the at least one processor, further cause the system to determine that the request includes a first indicator of the first type of operation; determining that the first API endpoint is associated with the first indicator; and determine, based at least in part on the request including the first indicator and the first API endpoint being associated with the first indicator, that the first API endpoint is configured to perform the first type of operation.

(S4) A system may be configured as described in paragraph (S3), and the at least one computer-readable medium may be further encoded with additional instructions which, when executed by the at least one processor, further cause the system to, prior to receiving the request, receive, from a second device, an indication that first API endpoint is configured to perform the first type of operation; store, based at least in part on the first API endpoint being configured to perform the first type of operation, a second indicator in association with the first API endpoint; and determine that the first API endpoint is associated with the first indicator at least in part by determining that the second indicator corresponds to the first indicator.

(S5) A system may be configured as described in any of paragraphs (S1) through (S4), and the at least one computer-readable medium may be further encoded with additional instructions which, when executed by the at least one processor, further cause the system to determine access credentials associated with a user of the source of the first API call; and use the access credentials to make the second API call.

(S6) A system may be configured as described in any of paragraphs (S1) through (S5), wherein the first API endpoint has a first input schema, the second API endpoint has a second input schema that is different than the first input schema, and the at least one computer-readable medium is further encoded with additional instructions which, when executed by the at least one processor, further cause the system to generate, by the computing system, the second API call according to the second input schema.

(S7) A system may be configured as described in any of paragraphs (S1) through (S6), wherein the first API endpoint has a first output schema, the second API endpoint has a second output schema that is different than the first output schema, and generating the second response may further involve generating, by the computing system, the second response in accordance with the first output schema.

(S8) A system may be configured as described in any of paragraphs (S1) through (S7), and the at least one computer-readable medium may be further encoded with additional instructions which, when executed by the at least one processor, further cause the system to receive, at a third API endpoint of the system, a third API call requesting performance of the first type of operation; invoke, based on the third API call, a second process to generate at least a fourth API call to a fourth API endpoint of a second system of record; receive, from the second system of record, a third response to the fourth API call; generate, based at least in part on the third response, a fourth response to the third API call; and send, to a source of the third API call, the fourth response.

(S9) A system may be configured as described in paragraph (S8), wherein the first API call and the third API call originate from a first device, and the at least one computer-readable medium may be further encoded with additional instructions which, when executed by the at least one processor, further cause the system to receive, from the first device, a request to identify API endpoints configured to perform the first type of operation; determine that the first API endpoint and the third API endpoint are both configured to perform the first type of operation; and send, to the first device and based at least in part on the first API endpoint and the third API endpoint both being configured to perform the first type of operation, indications of the first API endpoint and the third API endpoint.

(S10) A system may be configured as described in paragraph (S9), wherein determining that the first API endpoint and the third API endpoint are both configured to perform the first type of operation may further involve determining that the request includes a first indicator of the first type of operation; determining that the first API endpoint is associated with the first indicator; determining that the third API endpoint is associated with the first indicator; and determining, based at least in part on the request including the first indicator and the first API endpoint and the third API endpoint both being associated with the first indicator, that the first API endpoint and the third API endpoint are both configured to perform the first type of operation.

(S11) A system may be configured as described in paragraph (S10), and the at least one computer-readable medium may be further encoded with additional instructions which, when executed by the at least one processor, further cause the system to, prior to receiving the request, receive a first indication that first API endpoint is configured to perform the first type of operation; store, based at least in part on the first API endpoint being configured to perform the first type of operation, a second indicator in association with the first API endpoint; prior to receiving the request, receive a second indication that third API endpoint is configured to perform the first type of operation; and store, based at least in part on the third API endpoint being configured to perform the first type of operation, a third indicator in association with the third API endpoint; wherein determining that the first API endpoint is associated with the first indicator further comprises determining that the second indicator corresponds to the first indicator, and determining that the third API endpoint is associated with the first indicator further comprises determining that the third indicator corresponds to the first indicator.

The following paragraphs (CRM1) through (CRM11) describe examples of computer-readable media that may be implemented in accordance with the present disclosure.

(CRM1) At least one non-transitory computer-readable medium may be encoded with instructions which, when executed by at least one processor of a system, cause the system to receive, at a first application programming interface (API) endpoint of the system, a first API call requesting performance of a first type of operation; invoke, based on the first API call, a first process to send at least a second API call to a second API endpoint of a first system of record; receive, from the first system of record, a first response to the second API call; and send, to a source of the first API call, a second response that is based at least in part on the first response.

(CRM2) At least one non-transitory computer-readable medium may be configured as described in paragraph (CRM1), and the at least one computer-readable medium may be further encoded with additional instructions which, when executed by the at least one processor, further cause the system to receive, from the first device, a request to identify API endpoints configured to perform the first type of operation; determine that the first API endpoint is configured to perform the first type of operation; and send, to the first device and based at least in part on the first API endpoint being configured to perform the first type of operation, an indication of the first API endpoint.

(CRM3) At least one non-transitory computer-readable medium may be configured as described in paragraph (CRM2), and may be further encoded with additional instructions which, when executed by the at least one processor, further cause the system to determine that the request includes a first indicator of the first type of operation; determining that the first API endpoint is associated with the first indicator; and determine, based at least in part on the request including the first indicator and the first API endpoint being associated with the first indicator, that the first API endpoint is configured to perform the first type of operation.

(CRM4) At least one non-transitory computer-readable medium may be configured as described in paragraph (CRM3), and may be further encoded with additional instructions which, when executed by the at least one processor, further cause the system to, prior to receiving the request, receive, from a second device, an indication that first API endpoint is configured to perform the first type of operation; store, based at least in part on the first API endpoint being configured to perform the first type of operation, a second indicator in association with the first API endpoint; and determine that the first API endpoint is associated with the first indicator at least in part by determining that the second indicator corresponds to the first indicator.

(CRM5) At least one non-transitory computer-readable medium may be configured as described in any of paragraphs (CRM1) through (CRM4), and may be further encoded with additional instructions which, when executed by the at least one processor, further cause the system to determine access credentials associated with a user of the source of the first API call; and use the access credentials to make the second API call.

(CRM6) At least one non-transitory computer-readable medium may be configured as described in any of paragraphs (CRM1) through (CRM5), wherein the first API endpoint has a first input schema, the second API endpoint has a second input schema that is different than the first input schema, and the at least one computer-readable medium is further encoded with additional instructions which, when executed by the at least one processor, further cause the system to generate, by the computing system, the second API call according to the second input schema.

(CRM7) At least one non-transitory computer-readable medium may be configured as described in any of paragraphs (CRM1) through (CRM6), wherein the first API endpoint has a first output schema, the second API endpoint has a second output schema that is different than the first output schema, and generating the second response may further involve generating, by the computing system, the second response in accordance with the first output schema.

(CRM8) At least one non-transitory computer-readable medium may be configured as described in any of paragraphs (CRM1) through (CRM7), and may be further encoded with additional instructions which, when executed by the at least one processor, further cause the system to receive, at a third API endpoint of the system, a third API call requesting performance of the first type of operation; invoke, based on the third API call, a second process to generate at least a fourth API call to a fourth API endpoint of a second system of record; receive, from the second system of record, a third response to the fourth API call; generate, based at least in part on the third response, a fourth response to the third API call; and send, to a source of the third API call, the fourth response.

(CRM9) At least one non-transitory computer-readable medium may be configured as described paragraph (CRM8), wherein the first API call and the third API call originate from a first device, and may be further encoded with additional instructions which, when executed by the at least one processor, further cause the system to receive, from the first device, a request to identify API endpoints configured to perform the first type of operation; determine that the first API endpoint and the third API endpoint are both configured to perform the first type of operation; and send, to the first device and based at least in part on the first API endpoint and the third API endpoint both being configured to perform the first type of operation, indications of the first API endpoint and the third API endpoint.

(CRM10) At least one non-transitory computer-readable medium may be configured as described paragraph (CRM9), wherein determining that the first API endpoint and the third API endpoint are both configured to perform the first type of operation may further involve determining that the request includes a first indicator of the first type of operation; determining that the first API endpoint is associated with the first indicator; determining that the third API endpoint is associated with the first indicator; and determining, based at least in part on the request including the first indicator and the first API endpoint and the third API endpoint both being associated with the first indicator, that the first API endpoint and the third API endpoint are both configured to perform the first type of operation.

(CRM11) At least one non-transitory computer-readable medium may be configured as described in paragraph (CRM10), and may be further encoded with additional instructions which, when executed by the at least one processor, further cause the system to, prior to receiving the request, receive a first indication that first API endpoint is configured to perform the first type of operation; store, based at least in part on the first API endpoint being configured to perform the first type of operation, a second indicator in association with the first API endpoint; prior to receiving the request, receive a second indication that third API endpoint is configured to perform the first type of operation; and store, based at least in part on the third API endpoint being configured to perform the first type of operation, a third indicator in association with the third API endpoint; wherein determining that the first API endpoint is associated with the first indicator further comprises determining that the second indicator corresponds to the first indicator, and determining that the third API endpoint is associated with the first indicator further comprises determining that the third indicator corresponds to the first indicator.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:

receiving, by a computing system from a first device, a request to identify application programming interface (API) endpoints that are configured to perform a search operation;

determining, by the computing system, that first and second API endpoints of the computing system are both configured to perform search operation operations;

sending, from the computing system to the first device and based at least in part on the first and second API endpoints both being configured to perform search operations, indications of the first API endpoint and the second API endpoint;

receiving, at the first API endpoint and from the first device, a first API call requesting performance of a first search operation;

executing, by the computing system and based on the first API call, a first script to send at least a second API call to a third API endpoint of a first system of record, the second API call representing a request to perform the first search operation;

receiving, by the computing system and from the first system of record, first search results in response to the second API call;

generating, by the computing system and based at least in part on the first search results, a first response to the first API call, the first response representing the first search results;

sending, from the computing system to the first device, the first response;

receiving, at the second API endpoint and from the first device, a third API call requesting performance of a second search operation;

executing, by the computing system and based on the third API call, a second script to generate at least a fourth API call to a fourth API endpoint of a second system of record, the fourth API call representing a request to perform the second search operation;

receiving, by the computing system and from the second system of record, second search results in response to the fourth API call;

generating, by the computing system and based at least in part on the second search results, a second response to the third API call, the second response representing the second search results; and sending, from the computing system to the first device, the second response.

2. The method of claim 1, wherein determining that the first API endpoint is configured to perform the search operation further comprises:

determining that the request to identify the API endpoints includes a first indicator of the search operation;

determining that the first API endpoint is associated with the first indicator; and determining, based at least in part on the request to identify the API endpoints including the first indicator and the first API endpoint being associated with the first indicator, that the first API endpoint is configured to perform the search operation.

3. The method of claim 2 further comprising:

prior to receiving the request to identify the API endpoints, receiving, from a second device, an indication that the first API endpoint is configured to perform the search operation; and storing, by the computing system and based at least in part on the first API endpoint being configured to perform the search operation, a second indicator in association with the first API endpoint;

wherein determining that the first API endpoint is associated with the first indicator further comprises determining that the second indicator corresponds to the first indicator.

4. The method of claim 1, further comprising:

determining, by the computing system, access credentials associated with a user of the first API call; and using the access credentials to make the second API call.

5. The method of claim 1, wherein the first API endpoint has a first input schema, the second API endpoint has a second input schema that is different than the first input schema, and executing the first script further comprises:

generating, by the computing system, the second API call according to the second input schema.

6. The method of claim 1, wherein the first API endpoint has a first output schema, the second API endpoint has a second output schema that is different than the first output schema, and generating the second response further comprises:

generating, by the computing system, the second response in accordance with the first output schema.

7. The method of claim 1, wherein the first API call and the third API call originate from the first device, and the method further comprises:

receiving, by the computing system and from the first device, a request to identify API endpoints configured to perform a first type of operation;

determining, by the computing system, that the first API endpoint and the third API endpoint are both configured to perform the first type of operation; and sending, from the computing system to the first device and based at least in part on the first API endpoint and the third API endpoint both being configured to perform the first type of operation, indications of the first API endpoint and the third API endpoint.

8. The method of claim 7, wherein determining that the first API endpoint and the third API endpoint are both configured to perform the first type of operation further comprises:

determining that the request to identify the API endpoints includes a first indicator of the first type of operation;

determining that the first API endpoint is associated with the first indicator;

determining that the third API endpoint is associated with the first indicator; and determining, based at least in part on the request to identify the API endpoints including the first indicator and the first API endpoint and the third API endpoint both being associated with the first indicator, that the first API endpoint and the third API endpoint are both configured to perform the first type of operation.

9. The method of claim 8, further comprising:

prior to receiving the request to identify the API endpoints, receiving a first indication that first API endpoint is configured to perform the first type of operation;

storing, by the computing system and based at least in part on the first API endpoint being configured to perform the first type of operation, a second indicator in association with the first API endpoint;

prior to receiving the request, receiving a second indication that third API endpoint is configured to perform the first type of operation; and storing, by the computing system and based at least in part on the third API endpoint being configured to perform the first type of operation, a third indicator in association with the third API endpoint;

wherein determining that the first API endpoint is associated with the first indicator further comprises determining that the second indicator corresponds to the first indicator, and determining that the third API endpoint is associated with the first indicator further comprises determining that the third indicator corresponds to the first indicator.

* * * * *